Nov. 12, 1957

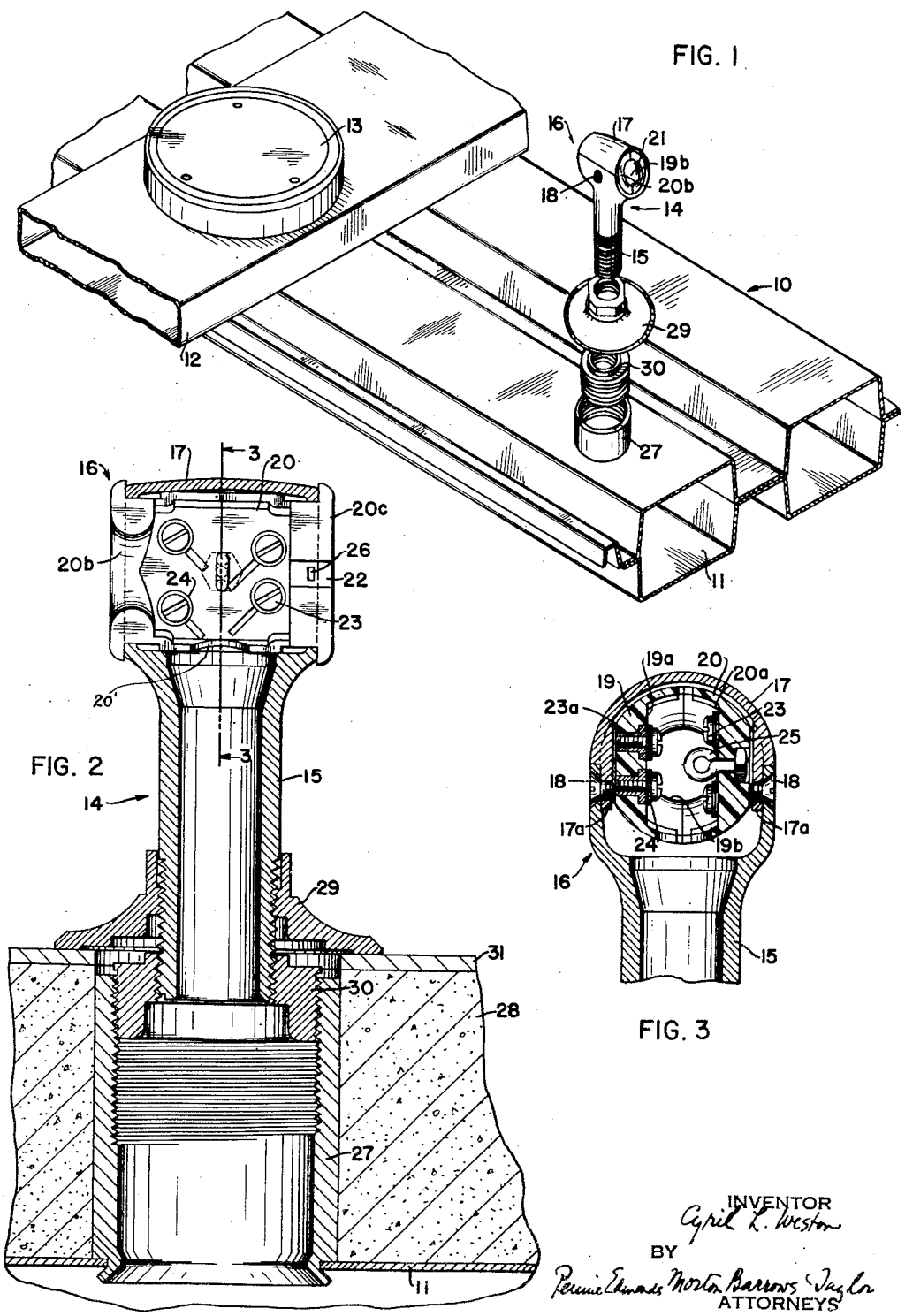

C. L. WESTON 2,813,143

DUCT SYSTEM OUTLET FITTINGS

Filed Feb. 17, 1955

INVENTOR
Cyril L. Weston
BY
Pennie Edmonds Morton Barrows Taylor
ATTORNEYS

United States Patent Office 2,813,143
Patented Nov. 12, 1957

2,813,143

DUCT SYSTEM OUTLET FITTINGS

Cyril L. Weston, Sellersville, Pa., assignor to Walker Brothers, Conshohocken, Pa., a corporation of Pennsylvania Application February 17, 1955, Serial No. 488,794

7 Claims. (Cl. 174—60)

This invention relates to fittings for use with floor duct systems of electrical distribution to provide outlets for service at selected points throughout the system. More particularly, the invention is concerned with a novel service fitting for low tension use, which contains a plurality of terminals for low tension circuits, such as those for telephones, annunciators, intercommunication systems, and the like. The new fitting is of simple construction and attractive appearance and it avoids the necessity of employing unsightly connector blocks, which are ordinarily mounted in an exposed position on a base board, desk, etc. The fitting may be made in different forms depending upon the number of terminals to be provided in the fitting but, in all instances, the terminals, while normally concealed and protected, are readily accessible by removal of a part of the fitting.

For a better understanding of the invention, reference may be had to the accompanying drawings, in which:

Fig. 1 is a view in perspective of a portion of an underfloor duct system with one of the new service outlet fittings shown with the parts in exploded relation;

Fig. 2 is a vertical sectional view through a portion of a duct and a fitting installed therein;

Fig. 3 is a sectional view on the line 3—3 of Fig. 2;

Figure 4:
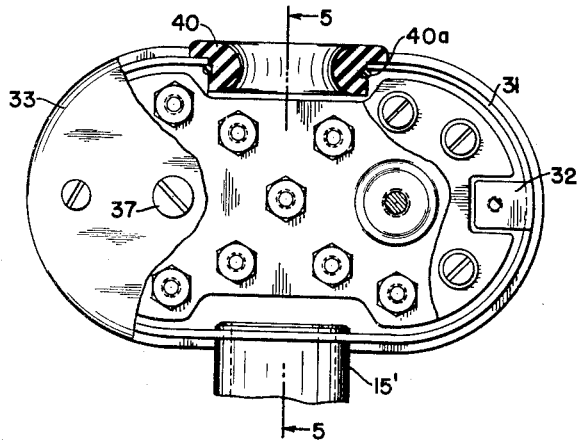
Fig. 4 is a view in elevation with parts broken away of a modified form of the fitting.

The fitting of the invention is illustrated in Fig. 1 with the parts separated and in position to be installed in an underfloor duct system, in which the raceways are formed by cells of a multi-cellular steel floor 10. In the system shown, the cell 11 is employed as a low tension raceway or duct and the wiring is led to the cell 11 from the usual wall cabinet or box through a header duct 12, which has an opening in its bottom registering with an opening in the top of raceway 11 and accessible through an access unit 13. The outlet fitting 14 of the invention comprises a tubular standpipe 15 externally threaded at its lower end and having an enlarged upper end forming a housing 16 elongated at right angles to the axis of the standpipe and open at both ends. The top 17 of the housing is removable and, in the construction shown, it is provided with ears 17a, which extend down into the lower part of the housing, so that the top can be held in place by screws 18 passing through openings in the lower part of the housing and into the ears.

A pair of like members 19, 20 of insulating material and of generally semi-cylindrical shape are mounted in the housing and have faces contacting in a vertical plane through the axes of the housing and the standpipe and defining a bottom opening 20', which leads to the space between the members and through which wires from the duct may be passed. The members have flat surfaces lying close to the inner surfaces of ears 17a and cooperating therewith to hold the members against rotation. The members also have spaced opposed faces 19a, 20a within the housing and extensions 19b, 20b, which project through one open end of the housing and cooperate to form a bushing lining the opening and defining an enlarged exit opening 21 for wires. At their other ends, the members are formed with extensions, of which only extension 20c is shown, and these extensions lie within the opening at the other end of the housing and form a bushing defining a small exit opening 22.

The insulating members 19, 20 are provided with a plurality of terminals in the form of screws 23, which are mounted within internally threaded bushings 23a molded in the insulating members. Each terminal screw is provided with a pair of washers 24, so that connections can be made through a terminal from a wire led up through the standpipe to a wire passing out through one of the end openings of the housing 16, the ends of the wires being wrapped about the terminal and kept separate by the washers. If the fitting is to be employed for telephone wiring, one of the members 19, 20 may be provided with an eye 25 for connection to a strand in the telephone cord, which relieves the connections of the cord wires to the terminals from strains tending to dislodge the wires from the terminals. In some instances, such a cord may have an enlargement rather than a strand for the purpose mentioned and, in that event, one of the members may have a recess 26 in the wall of opening 22 to receive the enlargement.

The fitting is installed in the system by cutting a hole at the desired point in the top wall of the duct and inserting the lower end of a tubular insert 27 into the opening, after which the lower end of the insert is expanded by a suitable tool to engage the undersurface of the top wall of the raceway, as shown in Fig. 2. The insert is internally threaded and it is of a length such as to extend upward almost to the top of the layer of concrete 28, which is poured over the multi-cellular floor to complete the floor structure. The lower threaded end of standpipe 15 is screwed through a floor plate support 29 and into an adapter 30, which is screwed into the interior of the insert. The floor plate rests upon the layer of linoleum 31 covering the concrete and, when the support 29 is tightened, it wedges the threads on the standpipe against those on the adapter to lock the standpipe firmly in position.

Figure 5:
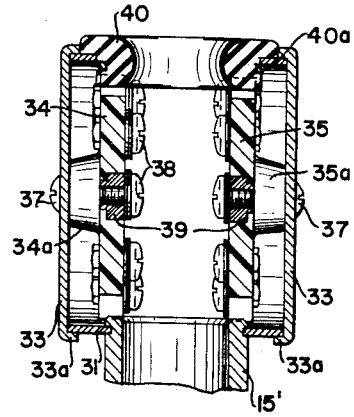
Fig. 5 is a sectional view on the line 5—5 of Fig. 4.

The outlet fitting shown in Figs. 1 to 3 provides eight terminals and, at some places along the duct system, it may be necessary to provide for increased service, in which event the fitting shown in Figs. 4 and 5 may be employed. This fitting comprises standpipe 15', which is similar to standpipe 15 and mounted in the duct in the same way. At its upper end, standpipe 15' carries a housing 31, which is generally oval in cross-section and has open sides with inwardly extending ears 32 at its ends. Cover plates 33 are provided to close the openings and have flanges 33a, which overlie the edges of the openings. The plates are held in place by screws passing through openings in the plates and into the ears 32.

A pair of members 34, 35 of insulating material are mounted on the inner sides of the cover plates and, for this purpose, each member is provided with a pair of bosses 34a, 35a, which abut the inner surface of a cover plate and receive screws 37, which pass through the plate and into the bosses. Each member 34, 35 is provided with a plurality of terminal screws 38 threaded into bushings 39 molded into the plate and, in the construction shown, each member carries thirteen terminals. At its top, the housing 31 is provided with an exit opening lined by an insulating bushing 40 held in place by a snap ring 40a.

Figure 6:
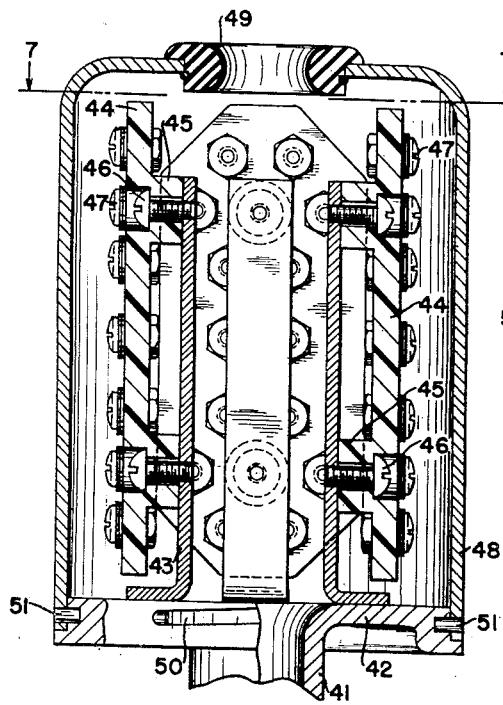
Fig. 6 is a vertical sectional view of another modified form of the new fitting.
Figure 7:
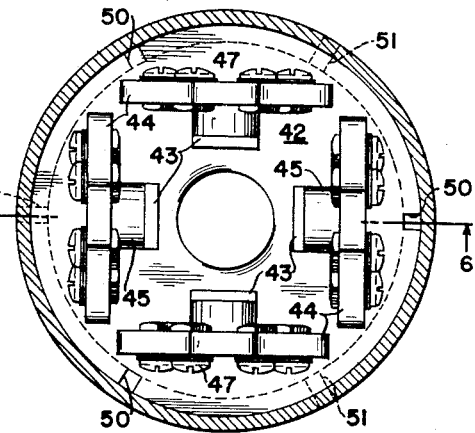
Fig. 7 is a sectional view on the line 7—7 of Fig. 6.

The new fitting in the form shown in Figs. 6 and 7 is for use at locations, where more terminals are required than are provided by the fittings above described. The Fig. 6 fitting comprises a standpipe 41 mounted in the duct in the same way as standpipe 15 and provided at its upper end with an integral radial flange 42 serving as a base, from which rise four standards 43 secured to the base in any suitable way and equally spaced about the axis of the standpipe. Each standard carries a plate 44 of insulating material having bosses 45, which engage the outer face of the standard, the plate being held in place by screws 46 passing through openings through the plate and bosses and into the standard. The plates are provided with a plurality of terminals 47.

The standards 43 and plates 44 are enclosed within a housing made up of base 42 and a top 48 of cup form having a central opening in its upper end, which contains a bushing 49 of insulating material. The internal diameter of top 48 is slightly greater than the external diameter of base 42 and the periphery of the base is provided with slots 50, which receive pins 51 carried by the top and extending inwardly. The pins may be inserted into the openings at the ends of the slots and the top may then be turned through an angle to cause the pins to pass down into the slots and secure the top firmly on the base.

All forms of the new fitting may be readily mounted in an opening in a duct and, in each case, removal of a part of the housing makes it possible to reach the terminals although, in the form shown in Fig. 1, the members 19, 20 must be removed from the housing before the connections can be made. Since the terminals are within the housing, the wiring can pass directly from the fitting to the electrical device being supplied and the former unsightly exposed connector blocks are eliminated.

I claim:

1. A service outlet fitting for use in a floor duct system of electrical distribution, which comprises a tubular standpipe provided with mounting means at its lower end, a housing at the upper end and open to the interior of the standpipe, the housing having a part removable to expose the interior of the housing, a pair of members of insulating material removably mounted within the housing and having opposed faces lying substantially parallel to the axis of the standpipe, a plurality of terminal elements mounted in the opposed faces of said members and lying wholly within the housing out of contact with the walls thereof, the members having portions exposed at said faces, at least one exit opening leading from the space within the housing between the opposed faces of the members, and an insulating bushing lining the exit opening.

2. The fitting of claim 1, in which the housing is elongated and the longitudinal axis of the housing is horizontal, the members are alike and meet in a vertical plane through the housing axis, the removable part of the housing is its top, and the members are removable from the housing, when the top is off.

3. The fitting of claim 2, in which the housing has exit openings at its ends and the members have extensions entering the exit openings and serving as bushings lining the openings.

4. The fitting of claim 2, in which the housing has flat vertical interior surfaces and the members have corresponding external surfaces lying between the housing surfaces and cooperating therewith to hold the members against rotational movement.

5. The fitting of claim 1, in which the housing is symmetrical with reference to a vertical plane containing the axis of the standpipe, and the members are alike and lie on opposite sides of said plane.

6. The fitting of claim 5, in which the housing is elongated horizontally, has side openings closed by cover plates, and the members are secured to the cover plates.

7. The fitting of claim 5, in which the exit opening of the housing is through its top and aligned with the standpipe.

References Cited in the file of this patent
UNITED STATES PATENTS

| | | |
|---|---|---|
| 364,994 | Degenhardt | June 14, 1887 |
| 1,654,659 | Mathews | June 3, 1928 |
| 1,820,995 | Wehman | Sept. 1, 1931 |
| 2,184,574 | Addie | Dec. 26, 1939 |
| 2,474,328 | Rothfuchs | June 28, 1949 |